(12) United States Patent
Ichikawa et al.

(10) Patent No.: US 9,421,877 B2
(45) Date of Patent: Aug. 23, 2016

(54) POWER TRANSMISSION SYSTEM AND POWER SUPPLY DEVICE FOR VEHICLES

(75) Inventors: Shinji Ichikawa, Toyota (JP); Tetsuhiro Ishikawa, Toyota (JP); Hiroshi Hirayama, Nagoya (JP); Nobuyoshi Kikuma, Nagoya (JP); Kunio Sakakibara, Nagoya (JP)

(73) Assignees: TOYOTA JIDOSHA KABUSHIKI KAISHA, Toyota (JP); NATIONAL UNIVERSITY CORPORATION NAGOYA INSTITUTE OF TECHNOLOGY, Nagoya (JP)

( * ) Notice: Subject to any disclaimer, the term of this patent is extended or adjusted under 35 U.S.C. 154(b) by 930 days.

(21) Appl. No.: 13/521,154

(22) PCT Filed: Jan. 10, 2011

(86) PCT No.: PCT/IB2011/000019
§ 371 (c)(1),
(2), (4) Date: Aug. 7, 2012

(87) PCT Pub. No.: WO2011/086445
PCT Pub. Date: Jul. 21, 2011

(65) Prior Publication Data
US 2012/0326499 A1 Dec. 27, 2012

(30) Foreign Application Priority Data
Jan. 12, 2010 (JP) .................. 2010-003998

(51) Int. Cl.
*H02J 17/00* (2006.01)
*B60L 11/18* (2006.01)
*H02J 5/00* (2016.01)

(52) U.S. Cl.
CPC .............. *B60L 11/182* (2013.01); *H02J 5/005* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........ B60L 11/182; B60L 11/18; H02J 5/005; Y02T 10/7005; Y02T 90/122; Y02T 90/14; Y02T 10/7088; H01F 38/14
USPC ............................................... 320/2; 307/104
See application file for complete search history.

(56) References Cited

U.S. PATENT DOCUMENTS 3,914,562 A * 10/1975 Bolger .......................... 191/10
4,496,896 A *  1/1985 Melocik ................... B60K 1/04
                                                                  320/108

(Continued)

FOREIGN PATENT DOCUMENTS

CH   WO 2010094990 A1 *  8/2010  ............ B60L 11/005
JP   A-07-337035         12/1995

(Continued)

OTHER PUBLICATIONS

Sep. 28, 2011 International Search Report issued in International Patent Application No. PCT/IB2011/000019.

(Continued)

*Primary Examiner* — Jared Fureman
*Assistant Examiner* — Michael Warmflash
(74) *Attorney, Agent, or Firm* — Oliff PLC

(57) ABSTRACT

A power transmission system has an AC power source and a high-frequency power driver that make up a high-frequency power source, and a primary self-resonant coil and a secondary self-resonant coil. The secondary self-resonant coil is magnetically coupled, by magnetic field resonance, to the primary self-resonant coil, and receives as a result high-frequency power from the primary self-resonant coil. The coils of the primary self-resonant coil and the secondary self-resonant coil resonate in an even mode when high-frequency power is transmitted from the primary self-resonant coil to the secondary self-resonant coil. Specifically, the primary self-resonant coil and the secondary self-resonant coil resonate in a state where currents in mutually opposite directions flow in the two coils.

4 Claims, 10 Drawing Sheets

(56) References Cited

U.S. PATENT DOCUMENTS

| | | | | |
|---|---|---|---|---|
| 4,800,328 | A | * | 1/1989 | Bolger et al. .................. 320/106 |
| 7,323,964 | B1 | * | 1/2008 | Shyu ....................... H01F 38/14 336/131 |
| 7,639,514 | B2 | * | 12/2009 | Baarman ......................... 363/16 |
| 2004/0000974 | A1 | * | 1/2004 | Odenaal ............. H01F 17/0006 333/219 |
| 2007/0145830 | A1 | | 6/2007 | Lee et al. |
| 2008/0157909 | A1 | * | 7/2008 | Chen et al. .................... 336/105 |
| 2010/0225271 | A1 | * | 9/2010 | Oyobe .................... B60L 5/005 320/108 |
| 2011/0156833 | A1 | | 6/2011 | Bohm et al. |
| 2012/0025625 | A1 | * | 2/2012 | Jufer .................... B60L 11/005 307/104 |

FOREIGN PATENT DOCUMENTS

| | | | |
|---|---|---|---|
| JP | A-08-175232 | | 7/1996 |
| JP | A-11-225401 | | 8/1999 |
| JP | A-2002-272134 | | 9/2002 |
| JP | A-2003-250233 | | 9/2003 |
| JP | 2009106136 A | * | 5/2009 |
| JP | A-2009-106136 | | 5/2009 |
| JP | A-2009-278837 | | 11/2009 |
| JP | A-2010-239847 | | 10/2010 |
| WO | WO 2008/138863 A2 | | 11/2008 |

OTHER PUBLICATIONS

Sep. 28, 2011 Written Opinion of the International Searching Authority issued in International Patent Application No. PCT/IB2011/000019.

Apr. 20, 2012 Written Opinion of the International Preliminary Examining Authority issued in International Patent Application No. PCT/IB2011/000019.

Nov. 14, 2011 Notification of Reason(s) for Refusal issued in Japanese Patent Application No. 2010-003998 (with translation).

* cited by examiner

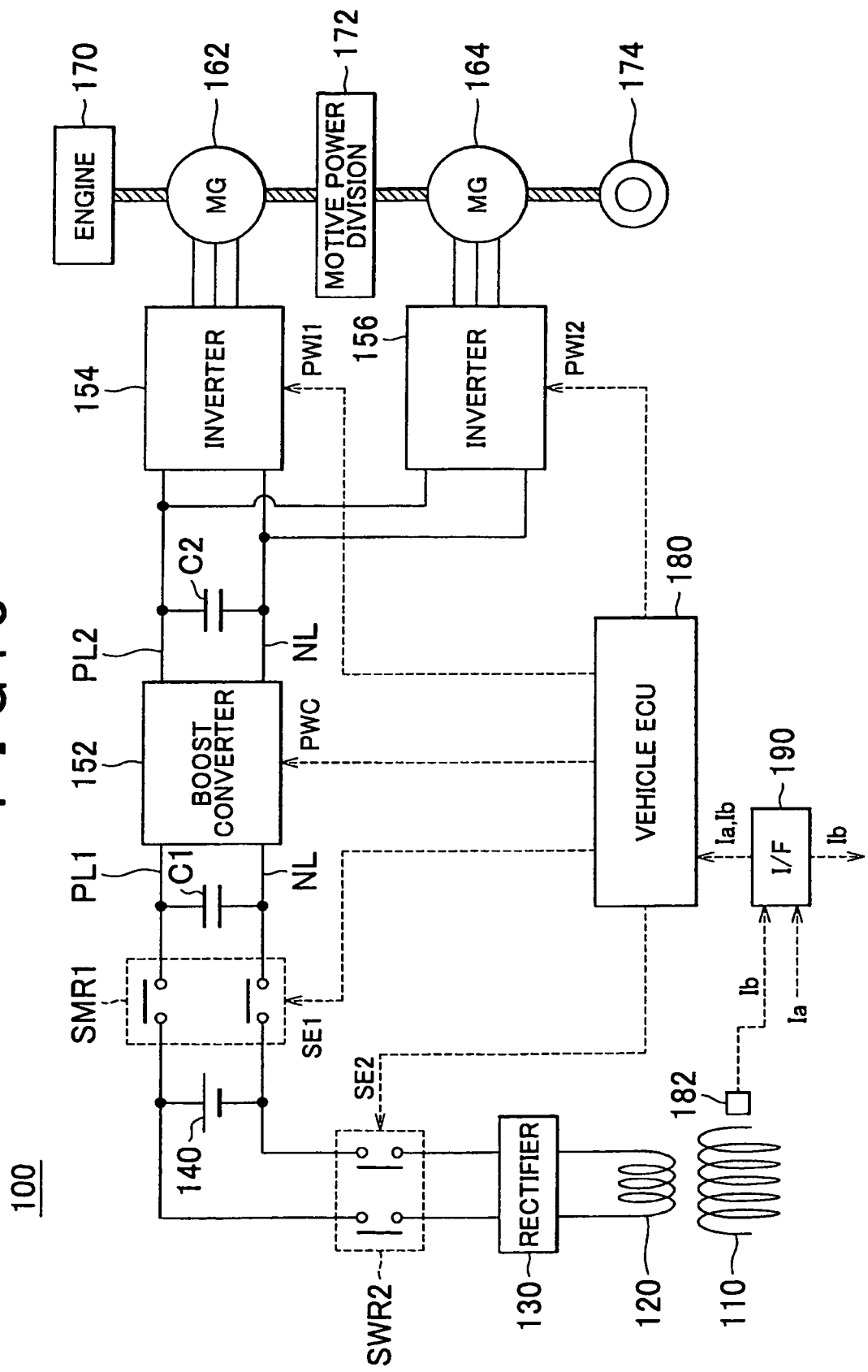

|  | Ds | D | Dd | Hs | Hd | Ra | Rb | Rs | Rd |
|---|---|---|---|---|---|---|---|---|---|
| [mm] | 50 | 300 | 50 | 200 | 200 | 250 | 250 | 300 | 300 |

ODD MODE

EVEN MODE

ODD MODE

EVEN MODE

POWER TRANSMISSION SYSTEM AND POWER SUPPLY DEVICE FOR VEHICLES

FIELD OF THE INVENTION

The invention relates to a power transmission system and to a power supply device for vehicles that uses the power transmission system, and in particular to contact-less power supply by resonance.

BACKGROUND OF THE INVENTION

Contact-less power supply in which power is supplied without power source cords or power transmission cables has been the object of attention in recent years. Conventional schemes for contact-less power supply include, for instance, power supply relying on electromagnetic induction, power supply relying on radio waves, and resonance methods wherein power is supplied relying on electromagnetic field resonance.

For instance, Japanese Patent Application Publication No. 2002-272134 (JP-A-2002-272134), Japanese Patent Application Publication No. 7-337035 (JP-A-7-337035), Japanese Patent Application Publication No. 8-175232 (JP-A-8-175232), Japanese Patent Application Publication No. 2003-250233 (JP-A-2003-250233) and Japanese Patent Application Publication No. 11-225401 (JP-A-11-225401) disclose power supply systems that rely on electromagnetic induction. Japanese Patent Application Publication No. 2009-106136 (JP-A-2009-106136), for instance, discloses a power supply system that relies on resonance.

JP-A-2009-106136 discloses an electric vehicle provided with a power storage device, and discloses a vehicle power supply device for supplying power to the power storage device. The power supply device for vehicles has a high-frequency power driver, a primary coil and a primary self-resonant coil, and the vehicle has a secondary self-resonant coil. The high-frequency power driver converts power received from a power source into high-frequency power. The primary coil receives high-frequency power from the power driver. The primary self-resonant coil is magnetically coupled to the secondary self-resonant coil by magnetic field resonance. The primary self-resonant coil transmits the high-frequency power received from the primary coil to the secondary self-resonant coil. The power received by the secondary self-resonant coil is supplied to the power storage device via a secondary coil and a rectifier that are installed in the vehicle.

Leak electromagnetic fields should ideally be reduced as much as possible in contact-less power supply. In the electromagnetic induction methods disclosed in JP-A-2002-272134, JP-A-7-337035, JP-A-8-175232, JP-A-2003-250233 and JP-A-11-225401, however, the size of the units must be increased in order to reduce leak electromagnetic fields. JP-A-2009-106136 describes the feature of providing a reflection wall for reflecting the magnetic flux that is generated by a primary self-resonant coil, in order to reduce leak electromagnetic fields. However, increasing the number of components that make up the power supply device is a factor that increases costs and that contributes to increasing the size of the power supply device. Thus, further study is required on ways of reducing leak electromagnetic fields in contact-less power supply.

DISCLOSURE OF THE INVENTION

The invention provides a power transmission system capable of reducing leak electromagnetic fields in power transmission by contact-less power supply, and provides a power supply device for vehicles that uses the power transmission system.

A first aspect of the invention relates to a power transmission system that has a high-frequency power source that generates high-frequency power; a first coil that receives the high-frequency power generated by the high-frequency power source; and a second coil that receives, by being magnetically coupled to the first coil through magnetic field resonance, the high-frequency power from the first coil. A frequency of the high-frequency power and a parameter relating to the first and second coils are selected such that the first and second coils resonate in a state where currents in mutually opposite directions flow in the first and second coils when the high-frequency power is transmitted from the first coil to the second coil.

The power transmission system may further have a first current sensor configured to be capable of detecting the direction of a first current flowing in the first coil; a second current sensor configured to be capable of detecting the direction of a second current flowing in the second coil; and a control device. The control device modifies at least one of the frequency of the high-frequency power and the parameter such that the direction of the first current as detected by the first current sensor and the direction of the second current as detected by the second current sensor are mutually opposite.

At least one coil of the first and second coils may be configured so that a capacitance value thereof can be modified. The parameter may include the capacitance value of the at least one coil. The control device may modify the capacitance value.

The high-frequency power source may be configured so that the frequency of the high-frequency power can be modified. The control device may control the high-frequency power source such that the frequency of the high-frequency power varies.

A second aspect of the invention relates to a power supply device for a vehicle, for supplying power to a power storage device installed in the vehicle. The power supply device has any of the power transmission systems above.

The invention allows reducing leak electromagnetic fields while avoiding increases in the size of a power supply device that carries out power transmission by contact-less power supply.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein

FIG. 3 is a functional block diagram illustrating the entire configuration of a power train of an electric vehicle 100 illustrated in FIG. 1;

DETAILED DESCRIPTION OF EMBODIMENTS

Figure 1:
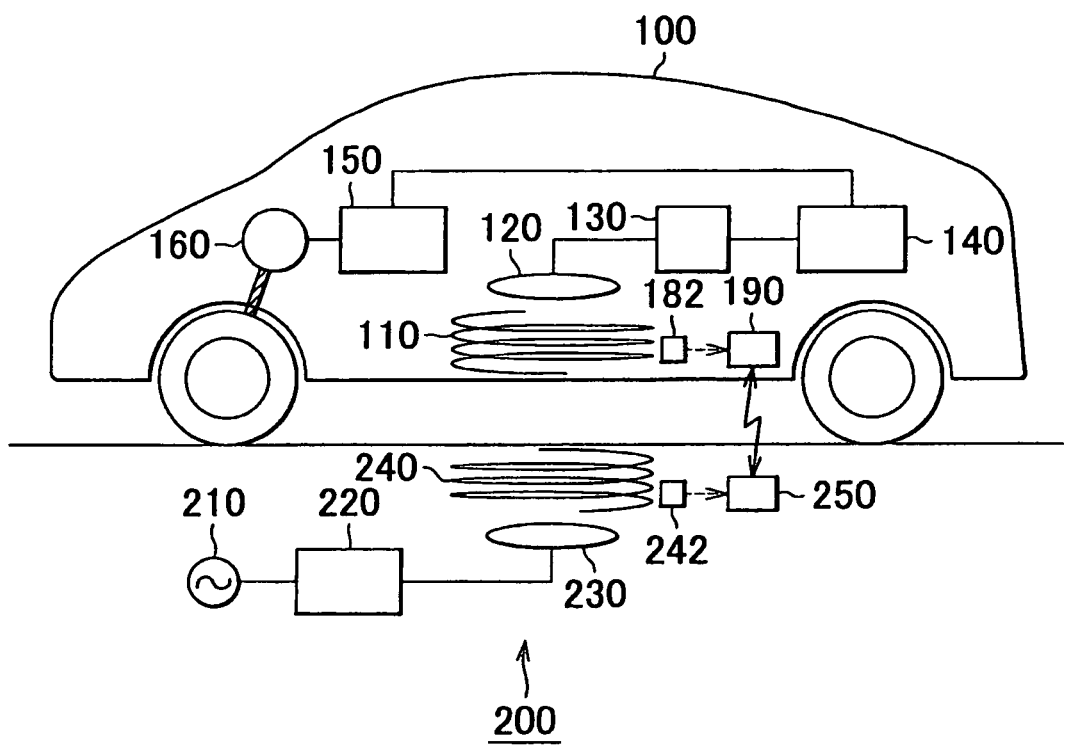
FIG. 1 is a diagram illustrating the basic configuration of a charging system that has a power transmission system according to an embodiment of the invention.

FIG. 1 illustrates the basic configuration of a charging system that has a power transmission system according to an embodiment of the invention. With reference to FIG. 1, the charging system has an electric vehicle 100 and a power supply device 200.

The electric vehicle 100 has a secondary self-resonant coil 110, a secondary coil 120, a rectifier 130 and a power storage device 140. The electric vehicle 100 further has a power control unit (PCU) 150, a motor 160, a current sensor 182 and a communications device 190.

The secondary self-resonant coil 110 is disposed at the lower portion of the vehicle body. The secondary self-resonant coil 110 is an LC resonant coil both ends of which are open (contact-less), and is magnetically coupled, by magnetic field resonance, to a primary self-resonant coil 240 (described below) of the power supply device 200. The secondary self-resonant coil 110 is configured so as to be capable of receiving power from the primary self-resonant coil 240.

Specifically, the number of turns of the secondary self-resonant coil 110 is appropriately set on the basis of, for instance, the voltage of the power storage device 140, the distance between the primary self-resonant coil 240 and the secondary self-resonant coil 110, and the resonance frequency of the primary self-resonant coil 240 and the secondary self-resonant coil 110, in such a manner so as to increase, for instance, the Q value, which denotes the resonance strength between the primary self-resonant coil 240 and the secondary self-resonant coil 110, and x, which is the coupling coefficient of the primary self-resonant coil 240 and the secondary self-resonant coil 110.

The secondary coil 120 is configured so as to be capable of receiving power, by electromagnetic induction, from the secondary self-resonant coil 110, and is preferably disposed coaxially with the secondary self-resonant coil 110. The secondary coil 120 outputs, to the rectifier 130, the power received from the secondary self-resonant coil 110. The rectifier 130 rectifies the high-frequency AC power received from the secondary coil 120 and outputs the rectified power to the power storage device 140. Instead of the rectifier 130 there may be used an AC/DC converter that converts the high-frequency AC power received from the secondary coil 120 to the voltage level of the power storage device 140.

The power storage device 140 is a chargeable-dischargeable DC power source, and has, for instance, a secondary battery such as a lithium ion battery or a nickel hydride battery. The voltage of the power storage device 140 is, for instance about 200 V. The power storage device 140 stores power supplied from the rectifier 130 and also power generated by the motor 160, as described below. The power storage device 140 supplies the stored power to the PCU 150.

A large-capacitance capacitor may also be used as the power storage device 140. Any device may be used as the power storage device 140, so long as the device is a power buffer capable of storing temporarily power from the rectifier 130 or the motor 160, and capable of supplying that stored power to the PCU 150.

The PCU 150 converts to AC voltage the power supplied from the power storage device 140, and outputs the power to the motor 160, to drive this motor 160. Also, the PCU 150 rectifies the power generated by the motor 160, outputs that power to the power storage device 140, and charges the power storage device 140.

The motor 160 receives power supplied from the power storage device 140 via the PCU 150, generates thereby a vehicle driving force, and outputs that generated driving force to the wheels. The motor 160 generates electric power by receiving kinetic energy from, for instance, the wheels and/or an engine, not shown, and outputs the generated power to the PCU 150.

The current sensor 182 detects the direction and the magnitude of the current that flows in the secondary self-resonant coil 110. In case that current of one given direction flows in the secondary self-resonant coil 110, the current sensor 182 assigns a positive value to that current value, and outputs the assigned positive value. In case that current of a direction opposite to the above direction flows in the secondary self-resonant coil 110, the current sensor 182 assigns a negative value to that current value, and outputs the assigned negative value.

The communications device 190 is a communications interface for carrying out wireless communication with a communications device 250 that is provided in the power supply device 200.

The power supply device 200 has an AC power source 210, a high-frequency power driver 220, a primary coil 230, a primary self-resonant coil 240, a current sensor 242 and the communications device 250.

The AC power source 210 is a power source outside the vehicle, for instance a system power source. The high-frequency power driver 220 converts power received from the AC power source 210 to high-frequency power capable of being transmitted, through magnetic field resonance, from the primary self-resonant coil 240 to the secondary self-resonant coil 110 on the vehicle side, and supplies that converted high-frequency power to the primary coil 230. The AC power source 210 and the high-frequency power driver 220 function as a high-frequency power source that generates high-frequency power.

The primary coil 230 is configured so as to be capable of transmitting power, by electromagnetic induction, to the primary self-resonant coil 240, and is preferably disposed coaxially with the primary self-resonant coil 240. The primary coil 230 outputs also, to the primary self-resonant coil 240, power received from the high-frequency power driver 220.

The primary self-resonant coil 240 is disposed in the vicinity of the ground surface. The primary self-resonant coil 240 is an LC resonant coil both ends of which are open, and is configured so as to be magnetically coupled, by magnetic field resonance, to the secondary self-resonant coil 110 of the electric vehicle 100, and to be capable of transmitting power to the secondary self-resonant coil 110. Specifically, the number of turns of the primary self-resonant coil 240 is appropriately set on the basis of, for instance, the voltage of the power storage device 140 that is charged with power transmitted from the primary self-resonant coil 240, the distance between the primary self-resonant coil 240 and the secondary self-resonant coil 110, and the resonance frequency of the primary self-resonant coil 240 and the secondary self-resonant coil 110, in such a manner so as to increase, for instance, the Q value, which denotes the resonance strength between the primary self-resonant coil 240 and the secondary self-resonant coil 110, and x, which is the coupling coefficient of the primary self-resonant coil 240 and the secondary self-resonant coil 110.

The current sensor 242 detects the direction and magnitude of the current flowing in the primary self-resonant coil 240. If the direction of the current flowing in the primary self-resonant coil 240 is the same as the direction of the current flowing in the secondary self-resonant coil 110, the sign of the current value outputted by the current sensor 242 matches the sensing of the current value by the current sensor 182. If the direction of the current flowing in the primary self-resonant coil 240 is a direction opposite to the direction of the current flowing in the secondary self-resonant coil 110, the sign of the current value outputted by the current sensor 242 is the reverse of the sign of the current value by the current sensor 182.

The communications device 250 is a communications interface for carrying out wireless communication with the communications device 190 provided in the electric vehicle 100. The communications device 190 transmits values detected by the current sensor 182 to the communications device 250. The communications device 250 transmits values detected by the current sensor 242 to the communications device 190. Both the electric vehicle 100 and the power supply device 200 can grasp as a result the respective detection values of the current sensor 182 and the current sensor 242.

Figure 2:
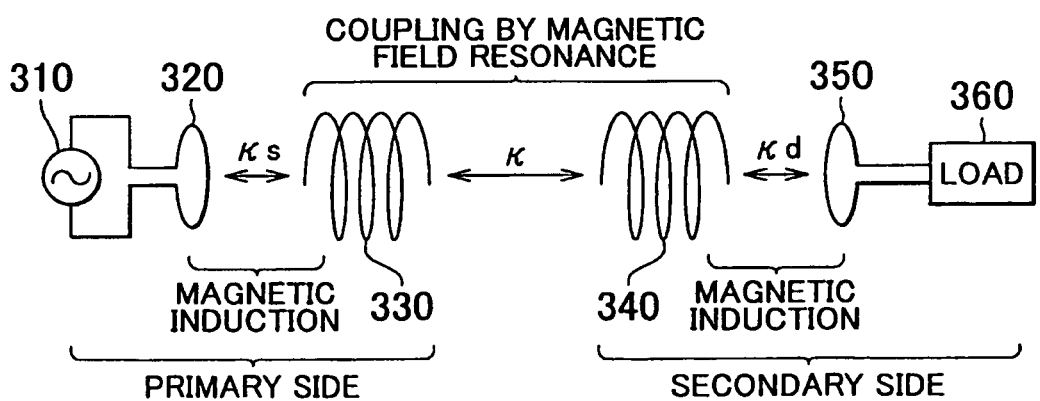
FIG. 2 is a diagram for explaining the principle of power transmission by resonance.

FIG. 2 is a diagram for explaining the principle of power transmission by resonance. With reference to FIG. 2, in a resonance method, two LC resonant coils having the same natural frequency resonate via a magnetic field, in a way similar to the resonance of two tuning forks. As a result, one of the coils transmits power to the other coil in a wireless (contact-less) manner.

When a high-frequency power source 310 causes high-frequency power to flow in a primary coil 320, a magnetic field is generated in the primary coil 320, whereupon high-frequency power is generated by electromagnetic induction in a primary self-resonant coil 330. The primary self-resonant coil 330 functions as an LC resonator due to the inductance of the coil itself and due to stray capacitance between conductors. Further, a secondary self-resonant coil 340 having the same resonant frequency as that of the primary self-resonant coil 330 is magnetically coupled, by magnetic field resonance, as a result of which power is transmitted to the secondary self-resonant coil 340.

A secondary coil 350 generates high-frequency power, which is supplied to a load 360, through electromagnetic induction, on account of the magnetic field generated in the secondary self-resonant coil 340 by the power received from the primary self-resonant coil 330.

In an explanation of the correspondence with the configuration of FIG. 1, the AC power source 210 and the high-frequency power driver 220 of FIG. 1 correspond to the high-frequency power source 310 of FIG. 2. The primary coil 230 and the primary self-resonant coil 240 of FIG. 1 correspond respectively to the primary coil 320 and the primary self-resonant coil 330 of FIG. 2, and the secondary self-resonant coil 110 and the secondary coil 120 of FIG. 1 correspond respectively to the secondary self-resonant coil 340 and the secondary coil 350 of FIG. 2. The rectifier 130 and the power storage device 140 of FIG. 1 correspond to the load 360 of FIG. 2.

FIG. 3 is a functional block diagram illustrating the entire configuration of a power train of the electric vehicle 100 illustrated in FIG. 1. With reference to FIG. 3, the electric vehicle 100 has the power storage device 140, a system main relay SMR1, a boost converter 152, inverters 154, 156, smoothing capacitors C1, C2, motor generators 162, 164, an engine 170, a motive power dividing mechanism 172, a drive wheel 174, and a vehicle electronic control unit (ECU) 180. The electric vehicle 100 further has the secondary self-resonant coil 110, the secondary coil 120, the rectifier 130 and a system main relay SMR2.

The electric vehicle 100 is a hybrid vehicle wherein the motor generator 164 and the engine 170 are installed as motive power sources. The engine 170 and the motor generators 162, 164 are connected to the motive power dividing mechanism 172. The electric vehicle 100 travels on account of the driving force generated by at least one from among the engine 170 and the motor generator 164. The motive power generated by the engine 170 is divided into two paths by the motive power dividing mechanism 172. One path is a transmission path to the drive wheel 174, and the other path is a transmission path to the motor generator 162.

The motor generator 162 is an AC rotating electrical machine, for instance a three-phase AC synchronous electric motor having a permanent magnet embedded in a rotor. The motor generator 162 generates power utilizing the kinetic energy of the engine 170 as divided by the motive power dividing mechanism 172. For instance, when the state of charge (SOC) of the power storage device 140 drops below a value established beforehand, the engine 170 starts up, the motor generator 162 generates power, and the power storage device 140 is charged.

The motor generator 164 is an AC rotating electrical machine, for instance a three-phase AC synchronous electric motor having a permanent magnet embedded in a rotor, as in the case of the motor generator 162. The motor generator 164 generates a driving force using at least one from among the power stored in the power storage device 140 and the power generated by the motor generator 162. The driving force of the motor generator 164 is transmitted to the drive wheel 174.

During acceleration and deceleration, upon braking or downhill running, the mechanical energy stored in the vehicle in the form of kinetic energy or potential energy is used to cause the motor generator 164 to be rotationally driven by way of the drive wheel 174, and the motor generator 164 operates as a dynamo. As a result, the motor generator 164 converts travel energy to power, and operates thereby as a regenerative brake that generates braking power. The power generated by the motor generator 164 is stored in the power storage device 140. The motor generators 162, 164 correspond to the motor 160 of FIG. 1.

The motive power dividing mechanism 172 has planetary gears such a sun gear, pinion gears, a carrier and a ring gear. The pinion gears mesh with the sun gear and the ring gear. The carrier, which supports the pinion gears in such a manner that the latter can rotate about themselves, is connected to the crankshaft of the engine 170. The sun gear is connected to a rotation shaft of the motor generator 162. The ring gear is connected to a rotation shaft of the motor generator 164 and to the drive wheel 174.

The system main relay SMR1 is disposed between the power storage device 140 and the boost converter 152. When a signal SE1 from the vehicle ECU 180 is activated, the system main relay SMR1 electrically connects the power storage device 140 to the boost converter 152, and when the signal SE1 is inactivated, breaks off the electric circuit between the power storage device 140 and the boost converter 152.

The boost converter 152 boosts the voltage outputted by the power storage device 140, on the basis of a signal PWC from the vehicle ECU 180, and outputs the boosted voltage to a positive line PL2. The boost converter 152 has, for instance, a DC chopper circuit.

The inverters 154, 156 are provided for the respective motor generators 162, 164. The inverter 154 drives the motor generator 162 on the basis of a signal PW11 from the vehicle ECU 180, and the inverter 156 drives the motor generator 164 on the basis of a signal PW12 from the vehicle ECU 180. The inverters 154, 156 have each, for instance, a three-phase bridge circuit. The boost converter 152 and the inverters 154, 156 correspond to the PCU 150 in FIG. 1.

The secondary self-resonant coil 110, the secondary coil 120 and the rectifier 130 are as explained in FIG. 1. The system main relay SMR2 is disposed between the rectifier 130 and the power storage device 140. When a signal SE2 from the vehicle ECU 180 is activated, the system main relay SMR2 electrically connects the power storage device 140 to the rectifier 130, and when the signal SE2 is inactivated, the system main relay SMR2 breaks off the electric circuit between the power storage device 140 and the rectifier 130.

The vehicle ECU 180 generates the signals PWC, PW11, PW12 for driving the boost converter 152 and the motor generators 162, 164, on the basis of the accelerator depression amount, the vehicle speed and signals from other various sensors, and outputs the generated signals PWC, PW11, PW12 to the boost converter 152 and the inverters 154, 156.

When the vehicle is traveling, the vehicle ECU 180 activates the signal SE1, to switch on thereby the system main relay SMR1, and inactivates the signal SE2, to switch off thereby the system main relay SMR2.

During charging of the power storage device 140 from an AC power source 210 (FIG. 1) external to the vehicle, by way of the secondary self-resonant coil 110, the secondary coil 120 and the rectifier 130, the vehicle ECU 180 inactivates the signal SE1, to switch off thereby the system main relay SMR1, and activates the signal SE2, to switch on thereby the system main relay SMR2.

The communications device 190 receives a current value (value of the current Ia that flows in the primary self-resonant coil 240) detected by the current sensor 242, and transmits the detection value (Ia) to the vehicle ECU 180. The communications device 190 receives a current value (value of the current Ib flowing in the secondary self-resonant coil 110) detected by the current sensor 182, and transmits that detection value (current Ib) to the vehicle ECU 180 and the communications device 250 of the power supply device 200.

In the electric vehicle 100, the system main relays SMR1, SMR2 are switched off and on, respectively, during charge of the power storage device 140 from the AC power source 210 (FIG. 1) external to the vehicle. The high-frequency charge power received from the secondary self-resonant coil 110 that is magnetically coupled, by magnetic field resonance, to the primary self-resonant coil 240 (FIG. 1) of the power supply device 200, is transmitted, by electromagnetic induction, to the secondary coil 120, is rectified by the rectifier 130, and is supplied to the power storage device 140.

The power transmission system according to the embodiment of the invention has at least the AC power source 210 and the high-frequency power driver 220 that make up the high-frequency power source, as well as the primary self-resonant coil 240 and the secondary self-resonant coil 110. More preferably, the power transmission system further has the current sensor 242, the current sensor 182 and the vehicle ECU 180. Yet more preferably, the power transmission system has the primary coil 230 and the secondary coil 120. The power supply device for vehicles according to the embodiment of the invention has the above-described power transmission system, and supplies power to the power storage device 140 that is provided in the electric vehicle 100.

During transmission of high-frequency power from the primary self-resonant coil 240 to the secondary self-resonant coil 110 in the embodiment of the invention, the coils of the primary self-resonant coil 240 and of the secondary self-resonant coil 110 resonate in a state where current flows, in mutually opposite directions, in the primary self-resonant coil 240 and the secondary self-resonant coil 110. This allows reducing, as a result, leak electromagnetic fields (in the explanation hereafter, also referred to as "far-field radiation"). The frequency of the high-frequency power and the parameters of the coils (at least one coil from among the primary self-resonant coil 240 and the secondary self-resonant coil 110) are selected in order to cause the primary self-resonant coil 240 and the secondary self-resonant coil 110 to resonate in the above-described state.

Reducing leak electromagnetic fields allows simplifying the structure for shielding against the latter, which in turn allows preventing the size of the power supply device from increasing. The cost incurred in members (reflective walls or the like) for shielding against leak electromagnetic fields can also be reduced as a result. The embodiment allows realizing therefore a power transmission system that can reduce leak electromagnetic fields while avoiding increases in system size.

The resonance mode between the primary self-resonant coil 240 and the secondary self-resonant coil 110 is explained in detail next.

Resonance Mode: 1. Analysis Model

Figures 4A, 4B:
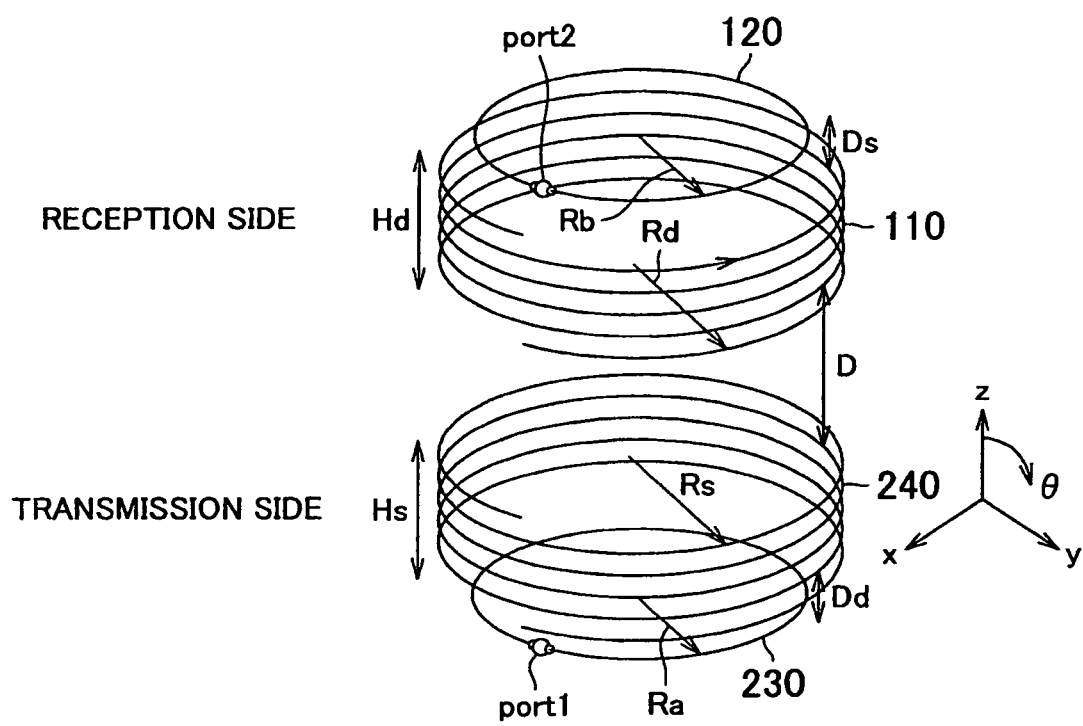
FIGS. 4A and 4B are diagrams for explaining an analysis model of a power transmission system according to an embodiment of the invention.

FIGS. 4A and 4B are diagrams for explaining an analysis model of the power transmission system according to an embodiment of the invention. FIG. 4A illustrates an analysis model, and FIG. 4B illustrates examples of specific values of structure parameter in the analysis model. The invention is not limited by the parameter values illustrated in FIG. 4B.

With reference to FIGS. 4A and 4B, both the transmission side and the reception side have each one loop structure and one helical structure. To make clearer the correspondence between FIG. 4A and FIG. 1, FIG. 4A illustrates the loop structure 230 and the helical structure 240 on the transmission side, and the loop structure 120 and the helical structure 110 on the reception side.

The loop structures have a terminal from which power is supplied, on the transmission side, and from which power is extracted, on the reception side. The loop structure is sufficiently small with respect to the wavelength in the used frequency band, and hence the loop can be considered to be a small loop, which itself has no sharp frequency characteristic. The loop structure and the helical structure are electrically insulated, and power is exchanged by electromagnetic induction. Both helical structures have open ends, such that the resonance frequency thereof is determined by the helix-derived inductance and capacitance between windings. Power is exchanged between the two helical structures on account of electromagnetic resonance phenomena.

The structure parameters illustrated in FIG. 4B are as follows. Ds is the gap between the helical structure and the loop structure on the reception side, D is the gap between the helical structure on the transmission side and the helical structure on the reception side, Dd is the gap between the helical structure and the loop structure on the transmission side, Hs is the height of the transmission-side helical structure (length in direction Z is referred to as height. Likewise hereafter), Hd is the height of the transmission-side helical structure, Ra is the radius of the transmission-side loop structure, Rb is the radius of the reception-side loop structure, Rs is the radius of the transmission-side helical structure, and Rd is the radius of the reception-side helical structure.

In order to adapt the power transmission system to an arbitrary application, for instance the above-described electric vehicle, it is necessary to establish a method for working out the structure parameters in order to maximize propagation efficiency at the designated frequency of use. To that end, it is useful to clarify the mechanism whereby resonance frequency is decided in the above structure. The structure was analyzed therefore in accordance with a moment method. A voltage source of 1 V was connected to Port1, being a transmission port provided in the transmission-side loop. Port2, as a reception port provided in the reception-side loop, had a 50Ω termination. To simplify modeling, all loops and helical structures were assumed to be perfect conductors (Radio Frequency Choke Coil: RFC), and no conductor loss was factored in.

2. Input Impedance

Figure 5:
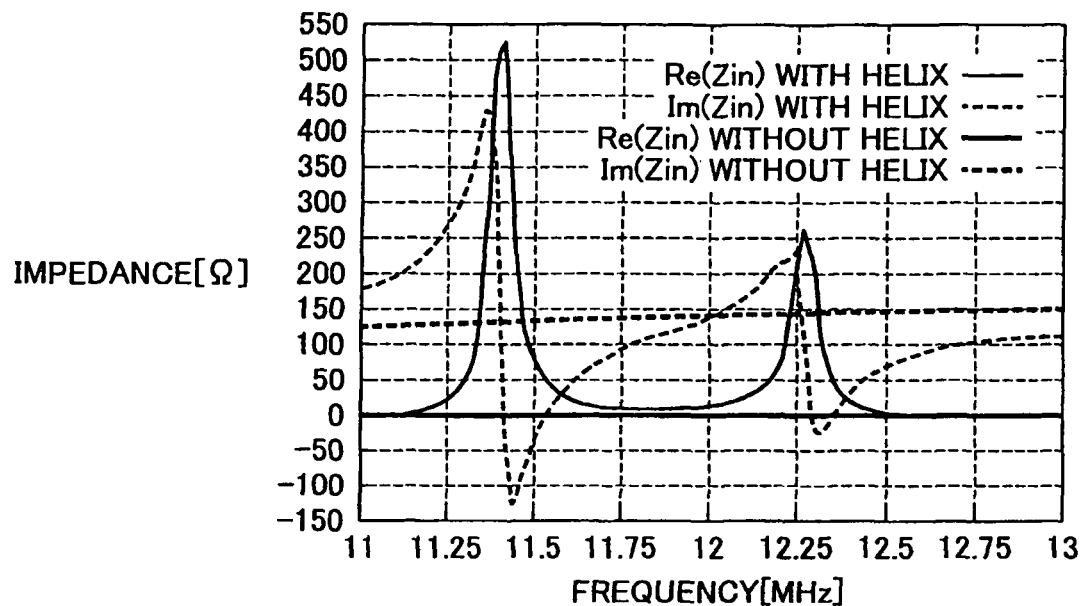
FIG. 5 is a diagram illustrating a real part and an imaginary part of input impedance $Z_{in}$ as viewed from port 1 illustrated in FIGS. 4A and 4B.

Firstly, input impedance was calculated in order to work out the resonance frequency. FIG. 5 illustrates the real part and the imaginary part of input impedance $Z_{in}$ as viewed from port 1 illustrated in FIGS. 4A and 4B. The thin lines illustrate calculation values of a power transmission system illustrated in FIGS. 4A and 4B, and the thick lines are calculation values in case that the helical structure, as the resonance mechanism, is excluded and only the loop structure remains, on the basis of the model illustrated in FIGS. 4A and 4B. A comparison between the thick and the thin lines reveals the contribution of the helical structure to input impedance.

If the loop structure stands alone, the real part of the input impedance is substantially 0Ω, and the imaginary part has a gentle frequency characteristic. When the helical structure is added, by contrast, the input impedance approaches asymptotically the values in the case of the loop alone, at frequencies lower than 11.25 MHz and higher than 12.5 MHz, but two resonances occur between these frequencies. The real part of input impedance in an actual power transmission system exhibits maximum values of 525Ω and 219Ω at 11.4 MHz and 12.3 MHz, respectively. These resistance values are found to correspond to radiation resistance. At these frequencies, the values of the imaginary part of the input impedance coincide, both in cases where the helical structure is present and absent. At these frequencies, therefore, the reactance component contributed by the helical structure is 0, and resonance occurs between the transmission and reception helical structures.

3. Port Current

Figure 6:
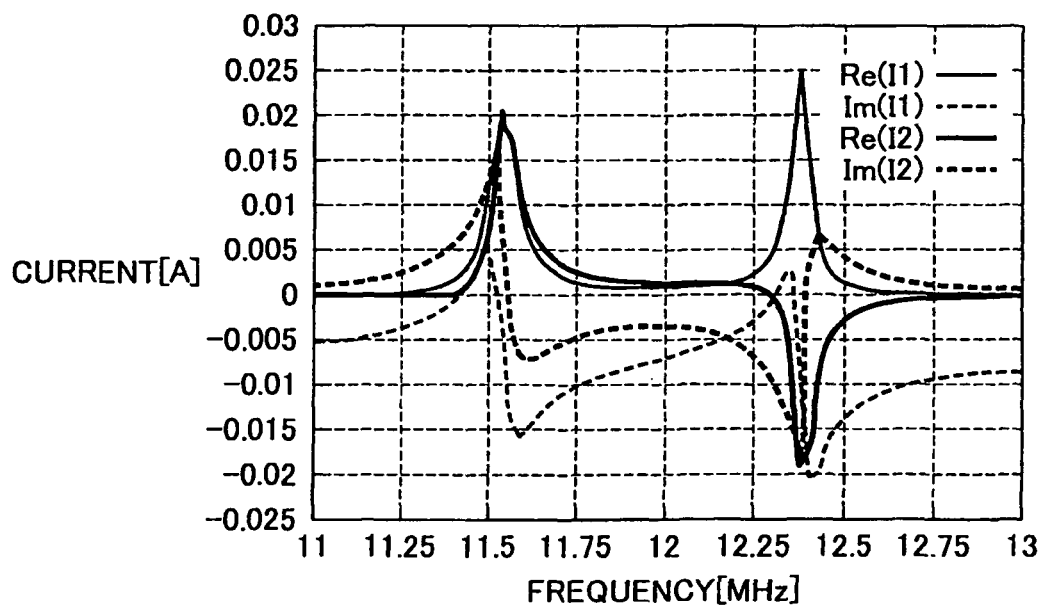
FIG. 6 is a diagram illustrating a frequency characteristic of currents $I_1$, $I_2$ that flow in an input port and an output port.

Port current was calculated in order to find what the modes of the two resonances were. FIG. 6 illustrates frequency characteristics of currents $I_1$, $I_2$ that flow in the input port and the output port. With reference to FIG. 6, the real part of the input port current takes on a positive maximum value at 11.4 MHz and 12.3 MHz. The real part of the output port current takes a positive maximum value at 11.4 MHz, but a negative maximum value at 12.3 MHz. As regards the imaginary part of port current, both port 1 and port 2 have the same frequency characteristic around 11.4 MHz, and opposite frequency characteristics around 12.3 MHz. This indicates that the 11.4 MHz resonance mode and the 12.3 MHz resonance mode are resonance modes at which the currents flowing in the output ports are the reverse of each other.

4. Magnetic Field Distribution and Equivalent Dipole Model

Magnetic field distribution was calculated in order to elucidate the mechanism that generates resonance. The magnetic field strength between transmission/reception antennas is maximal at 11.4 MHz. By contrast, the magnetic field strength between transmission/reception antennas is lowest at 12.3 MHz. Taking into account the bi-symmetry of small magnetic loops and small electric dipoles, the above two resonances can be expressed in the form of the electric dipoles illustrated in FIGS. 7A and 7B. The polarity of the electric dipoles can be explained by taking into account the port current direction at the respective frequencies. The magnitude and the direction of the magnetic field distribution can be explained in the light of electric force lines generated by the electric dipole.

Figure 7A:
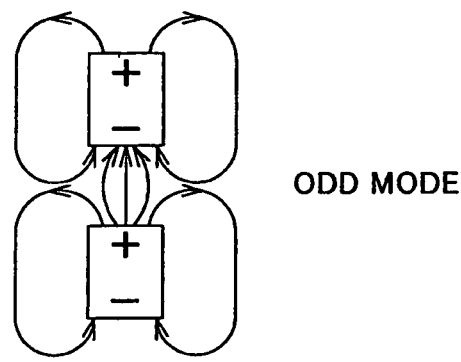
FIGS. 7A and 7B are diagrams for explaining electric dipoles in an odd mode and an even mode.
Figure 7B:
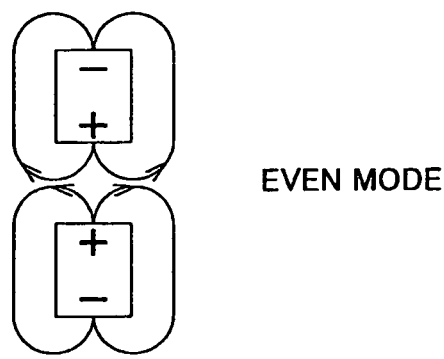

At 11.4 MHz, charge distribution is symmetrical because current flows in the same direction at the transmission/reception ports. Accordingly, the resonance mode at this frequency is referred to as "odd mode" in the description. Charge distribution is anti-symmetrical at 12.3 MHz, because current flows in opposite directions in the transmission/reception ports. Accordingly, the resonance mode at this frequency is referred to as "even mode" in the description. FIG. 7A illustrates an equivalent dipole model in the odd mode, and FIG. 7B illustrates an equivalent dipole model in the even mode.

The odd mode and the even mode can be explained by the direction of the magnetic flux that penetrates the transmission/reception antenna (coil).

Figure 8A:
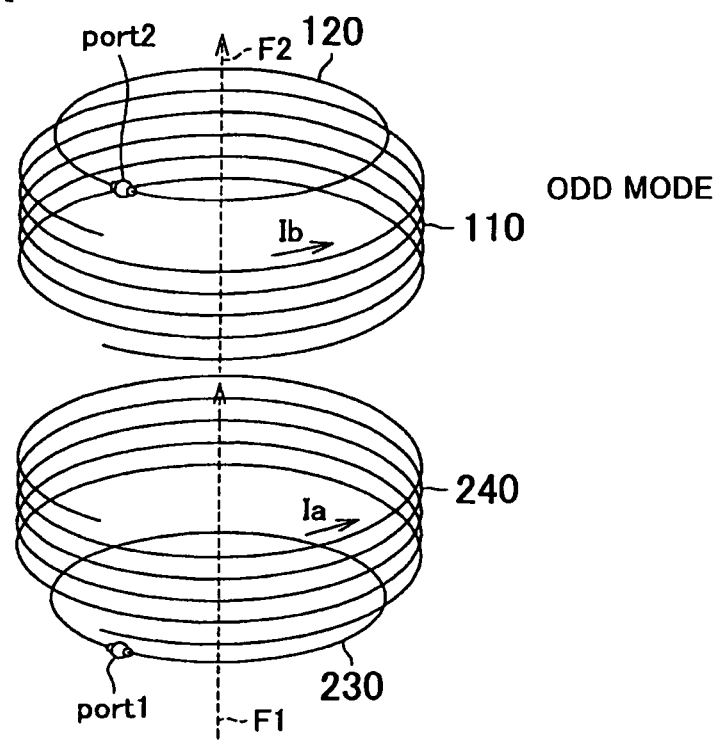
FIGS. 8A and 8B are diagrams for explaining a relationship between resonance mode and the direction of magnetic flux that penetrates a transmission/reception antenna.
Figure 8B:
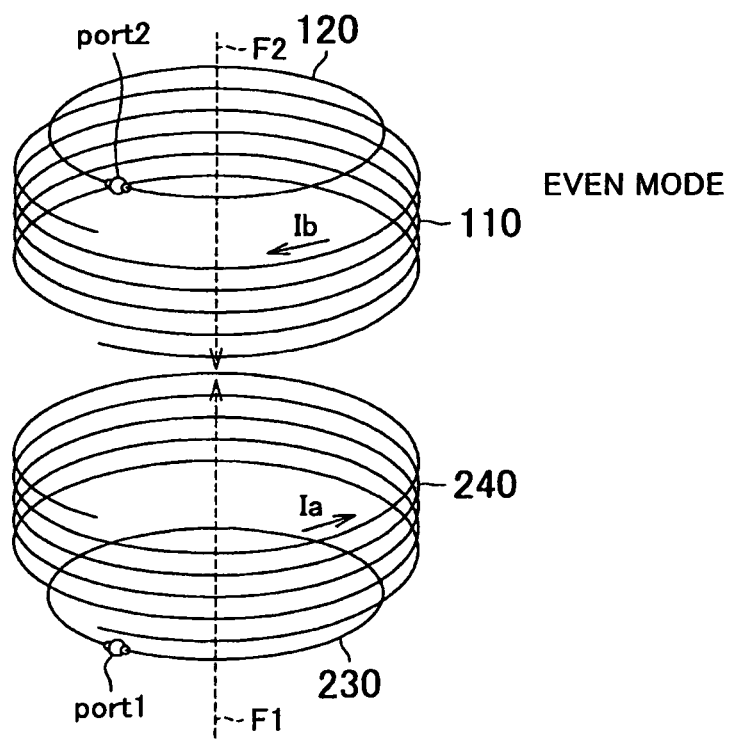

FIGS. 8A and 8B are diagrams for explaining the relationship between the resonance mode and the direction of the magnetic flux that penetrates the transmission/reception antennas. FIG. 8A illustrates the magnetic flux direction in the odd mode, and FIG. 8B illustrates the direction of magnetic flux in the even mode. With reference to FIGS. 8A and 8B, the direction of a magnetic flux F1 that penetrates the coil 240 and the direction of a magnetic flux F2 that penetrates the coil 110 are the same direction in the odd mode. Accordingly, the direction of the current Ia flowing in the coil 110 and the circumferential direction of the current Ib flowing in the coil 240 are identical. As a result, current flows in the same direction in the transmission port (port 1) and the reception port (port 2). In the even mode, by contrast, the direction of the magnetic flux F1 that penetrates the coil 240 and the direction of the magnetic flux F2 that penetrates the coil 110 are mutually opposite, and hence current flows in opposite directions in coils 110, 240. As a result, current flows in opposite directions in the transmission port and the reception port.

5. Transmission Efficiency

Power transmission efficiency is calculated on the basis of Equation (1) below.

$$\eta = \frac{Z_l|I_2|^2}{|I_1||V_1|} \qquad (1)$$

In the equation, $I_1$ and $V_1$ are the current and voltage at port 1 respectively, and $Z_1$ and $I_2$ are the resistance value of the load connected to port 2, and the current of port 2, respectively.

Figure 9:
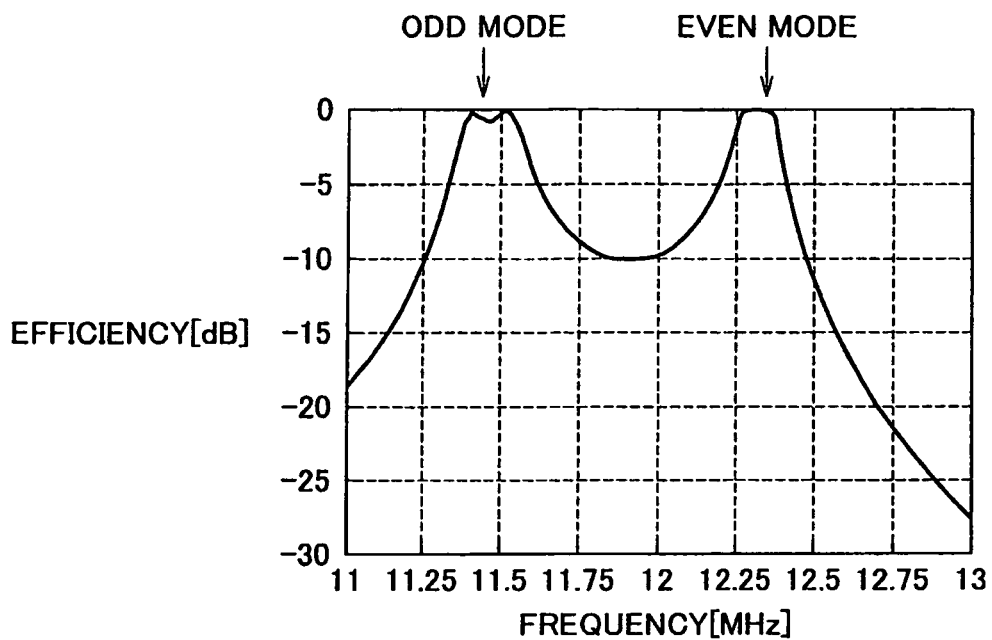
FIG. 9 is a diagram illustrating a frequency characteristic of power transmission efficiency.

FIG. 9 illustrates a frequency characteristic of power transmission efficiency. The maximum power transmission efficiency in the even mode and the odd mode are −0.115 dB and −0.003 dB, respectively. However, conductor loss has not been factored into the analysis, and hence achieving these efficiencies would be difficult. The analysis is performed in a state where the voltage source is connected to port 1, without taking impedance matching into account.

The figure shows that, in each mode, there are two frequencies at which efficiency is maximal. That is arguably because the input impedance (FIG. 5) from the helical structure and from the loop structure are added, as a result of which the frequency at which resonance occurs (reactance from the helical structure equals 0) and the resonant frequency at which reactance becomes 0, in terms of input, are offset from each other. Although impedance matching is not factored into the analysis, the resonance frequency and the resonant frequency can be made to match each other by complex conjugate matching.

In a hypothetical sphere that encompasses a transmission antenna and a reception antenna, the power balance in such a structure can be expressed by Equation (2) to Equation (7) below, by applying Poynting's theorem to the volume V and the surface area S of the sphere.

$$P_p = P_r + P_w + P_d \quad (2)$$
where
$$P_p = \iiint_V P_s dV \quad (3)$$
$$= P_{in} - P_{out} \quad (4)$$
$$P_r = \iint_S S \cdot n dS \quad (5)$$
$$P_w = \frac{\partial}{\partial t} \iiint_V \left(\frac{1}{2}\mu H^2 + \frac{1}{2}\varepsilon E^2\right) dV \quad (6)$$
$$P_d = \iiint_V \sigma E^2 dV \quad (7)$$

In the equations, $P_{in}$ denotes power supplied to the transmission port, $P_{out}$ denotes power taken out from the reception port, $P_r$ denotes far-field radiation power, $P_w$ denotes stored power within a region, and $P_d$ denotes loss power within the region. In ordinary antennas used in far-field conditions, $P_p$ can be considered to be converted to far-field radiation power $P_r$, but in wireless power transmission the far-field radiation power $P_r$ is lost.

6. Far-Field Radiation

The magnitude of far-field radiation is maximized in ordinary antennas. Specifically, the gain of the antenna must be maximized. In a wireless power transmission system, by contrast, far-field radiation not only results in power transmission loss, but interferes also with other systems, in the form of extraneous radiation. Therefore, the magnitude of far-field radiation is required to be minimized in this case.

Accordingly, the magnitude of the far-field radiation is minimized in the embodiment of the invention. Firstly, the gain of the antennas was worked out by considering the reception antenna to be a parasitic element terminated with a resistor and disposed in the vicinity of the transmission antenna.

Figure 10:
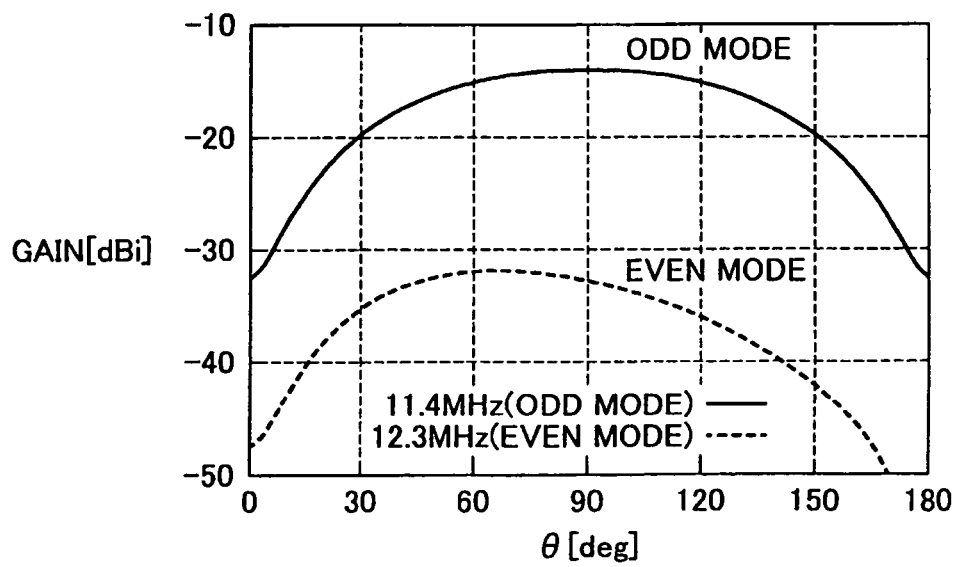
FIG. 10 is a diagram illustrating gain in the odd mode and the even mode.

FIG. 10 illustrates gain in the odd mode and the even mode. The maximum value of gain in the odd mode and the even mode are −13.8 dBi and −31.8 dBi, respectively. The maximum value in the even mode is lower than the maximum value in the odd mode by 18 dB. In the odd mode, in-phase excited small dipoles can be considered to be disposed close to each other, as a result of which the far fields generated by the small dipoles reinforce each other. In the even mode, by contrast, out-of-phase excited small dipoles can be considered to be disposed in the vicinity of each other, and hence the far fields cancel each other.

A small far-field radiation magnitude implies a small leak electromagnetic field. The magnitude of far-field radiation is smaller in the even mode than in the odd mode. Taking into account the magnitude of far-field radiation, the even mode is found to be more appropriate for wireless power transmission. In the embodiment of the invention, the even mode is selected as the resonance mode. Leak electromagnetic field can be reduced during power transmission between two coils by causing the two coils to resonate in the even mode.

Resonance Frequency: 1. Equivalent Circuit Model

Figure 11:
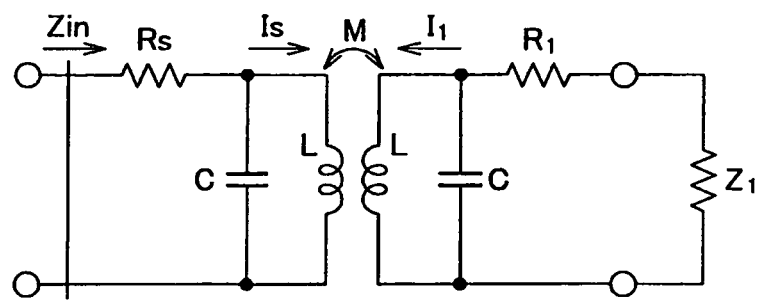
FIG. 11 is a diagram for explaining an equivalent circuit model of a helical structure on a transmission side and on a reception side of the power transmission system illustrated in FIGS. 4A and 4B.

FIG. 11 is a diagram for explaining an equivalent circuit model of the helical structures on the transmission side and the reception side of the power transmission system illustrated in FIGS. 4A and 4B. With reference to FIG. 11, the transmission side and the reception side are assumed to have the same structure. In the figure, L denotes the self-inductance of the helical structure, C denotes the capacitance between windings in the helical structure, M denotes the mutual inductance between the transmission/reception helical structures, and $R_s$, $R_1$ denote, respectively, resistance values corresponding to dielectric loss and conductor loss on the transmission side and the reception side. Further, Z) denotes load resistance, and $I_s$, $I_1$ denote respectively the currents flowing in the helical structure, on the transmission side and the reception side. In the above equivalent circuit only the helical structure has been considered, but not the loop structure.

In the equivalent circuit, the transmission-side helical structure is present on its own. If a resonance frequency in the absence of reception-side coupling is defined as $f_0$, the resonant frequency $f_0$ is represented by Equation (8) below.

$$f_0 = \frac{2\pi}{\sqrt{LC}} \quad (8)$$

By contrast, when the helical structures on the transmission side and the reception side are coupled with a mutual inductance M and resonate, the resonance frequency $f_{odd}$ in the odd mode and the resonance frequency $f_{even}$ in the even mode at that time are given by Equation (9) and Equation (10) below.

$$f_{odd} = \frac{2\pi}{\sqrt{C(L+M)}} \quad (9)$$
$$f_{even} = \frac{2\pi}{\sqrt{C(L-M)}} \quad (10)$$

In the light of Equation (9), the odd mode can be explained as a mode wherein current flows in the same direction on the transmission side and the reception side. As a result, self-inductance and mutual inductance are added, and total inductance increases, so that the resonance frequency is lower than in the case of no coupling between the transmission side and the reception side. The port current as well (FIG. 6) indicates an indication that current direction is the same on the transmission side and the reception side. FIG. 10 shows that, as a result, radiation becomes greater through in-phase addition at the far field. In the even mode, current flows in opposite directions on the transmission side and the reception side. As a result, mutual inductance is subtracted from self-inductance, and total inductance decreases thereby, so that the resonance frequency is higher than in the case of no coupling between the transmission side and the reception side.

As described above, κ represents the coupling coefficient that denotes the strength of the coupling between the transmission/reception helical structures (i.e., the primary self-resonant coil 240 and the secondary self-resonant coil 110 illustrated in FIG. 1). The coupling coefficient κ is defined as per Equation (11) below.

$$\kappa = \frac{M}{L} \quad (11)$$

On the basis of Equation (11), the resonance frequencies $f_{odd}$, $f_{even}$ can be respectively expressed by Equation (12) and Equation (13) below.

$$f_{odd} = \frac{f_0}{\sqrt{1+\kappa}} \quad (12)$$

$$f_{even} = \frac{f_0}{\sqrt{1-\kappa}} \quad (13)$$

Equation (12) and Equation (13) show that the difference in resonance frequency between the odd mode and the even mode depends on the coupling coefficient.

Power Transmission by Resonance in the Even Mode

The positional relationship between the transmission/reception helical structures illustrated in FIGS. 4A and 4B, i.e. the positional relationship between the primary self-resonant coil 240 and the secondary self-resonant coil 110 is not limited to being identical at all times. The resonance frequency may vary if the coupling coefficient κ changes depending on the use environment.

In the embodiment of the invention, in particular, the secondary self-resonant coil 110 is installed in a vehicle. For charging the vehicle, the electric vehicle 100 must move to the site of the power supply device 200. Accordingly, there is a high likelihood that the positional relationship between the primary self-resonant coil 240 and the secondary self-resonant coil 110 changes every time that the electric vehicle 100 stops at the position of the power supply device 200.

The distance between the vehicle and the power supply device varies also depending on, for instance, the loading state of the vehicle, air pressure in the tires and so forth. Changes in the distance between the primary self-resonant coil of the power supply device and the secondary self-resonant coil of the vehicle give rise to changes in the resonance frequency of the primary self-resonant coil and the secondary self-resonant coil.

In the embodiment of the invention, therefore, the power transmission system is controlled in such a manner that the primary self-resonant coil of the power supply device and the secondary self-resonant coil of the vehicle resonate in the even mode.

1. Fixed Frequency of Use.

The frequency used in the power transmission system may be fixed for various conceivable reasons. In Japan, for instance, the frequency of use is limited to one frequency, pursuant to the provisions of the Radio Act.

In such cases, power must be transmitted without changes in the resonance frequency. If the frequency of use is fixed, therefore, the primary self-resonant coil 240 and the secondary self-resonant coil 110 are configured in such a manner that at least one capacitance value of the primary self-resonant coil 240 and of the secondary self-resonant coil 110 is variable. A representative example of an instance where the capacitance value of the secondary self-resonant coil 110 is variable will be explained next.

Figure 12:
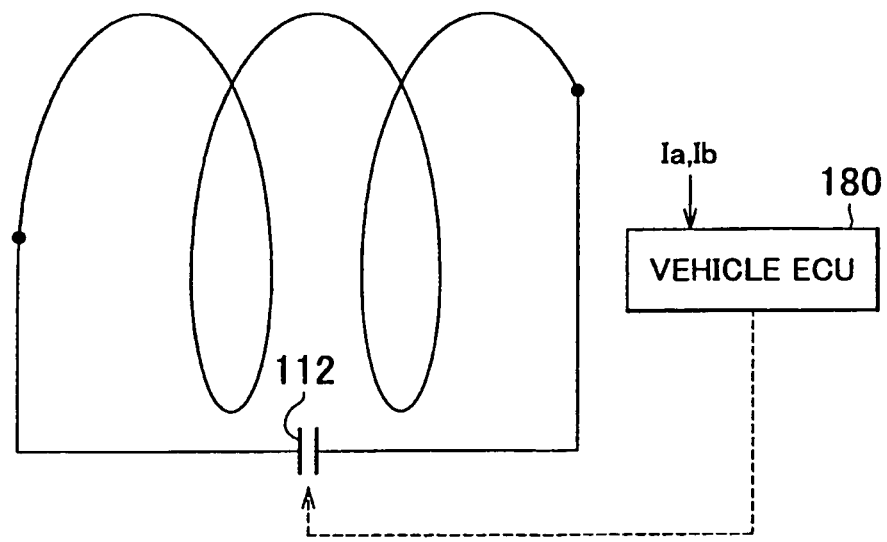
FIG. 12 is a diagram illustrating one configuration example of a secondary self-resonant coil having a variable capacitance value.

FIG. 12 is a diagram illustrating one configuration example of a secondary self-resonant coil having a variable capacitance value. With reference to FIG. 12, the secondary self-resonant coil 110 has a variable capacitor 112 connected between conductors. The capacitance of the variable capacitor 112 varies on the basis of a control signal from the vehicle ECU 180, so that the capacitance of the secondary self-resonant coil 110 is made variable through modification of the capacitance of the variable capacitor 112. If no variable capacitor 112 is provided, the capacitance of the secondary self-resonant coil is determined by the stray capacitance between conductors. In the secondary self-resonant coil 110, thus, the capacitance of the secondary self-resonant coil 110 can be modified by modifying the capacitance of the variable capacitor 112 connected between conductors.

Figure 13:
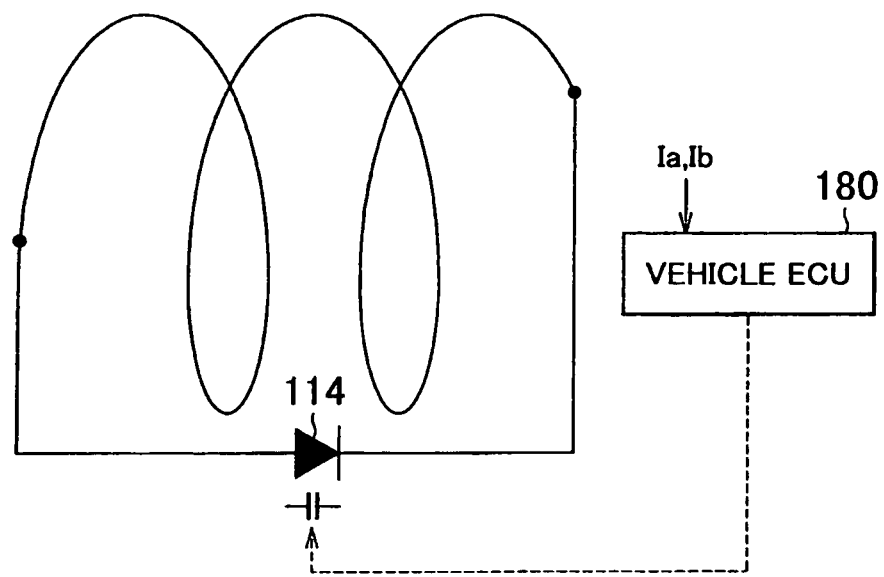
FIG. 13 is a diagram illustrating another configuration example of a secondary self-resonant coil having a variable capacitance value.

FIG. 13 is a diagram illustrating another configuration example of a secondary self-resonant coil having a variable capacitance value. This secondary self-resonant coil 110 has a variable capacitance diode 114 connected between conductors. The capacitance of the variable capacitance diode 114 varies on the basis of a control signal from the vehicle ECU 180, so that the capacitance of the secondary self-resonant coil 110 is made variable through modification of the capacitance of the variable capacitance diode 114, as in the case of the variable capacitor 112.

The vehicle ECU 180 modifies the capacitance of the secondary self-resonant coil 110, and determines whether or not the values of the currents Ia, Ib detected by the current sensor have opposite signs. The vehicle ECU 180, causes the capacitance of the secondary self-resonant coil 110 to vary in such a way that the detection values of the currents Ia, Ib take on opposite signs.

As Equation (10) shows, the resonance frequency $f_{even}$, in the even mode is determined based on the self-inductance, the mutual inductance, and the capacitance of the two coils. The mutual inductance M may vary in response to changes in the positional relationship between the primary self-resonant coil 240 and the secondary self-resonant coil 110. By contrast, the resonance frequency $f_{even}$ in the even mode is the frequency of use of the power transmission system, and hence is limited to one frequency, as described above. The respective self-inductances L of the primary self-resonant coil and the secondary self-resonant coil are determined beforehand on the basis of, for instance, number of turns per unit length, coil length, cross-sectional area and magnetic permeability of the materials.

Therefore, the positional relationship between the primary self-resonant coil 240 and the secondary self-resonant coil 110 varies in response to changes in the capacitance C of the coils. As a result, the primary self-resonant coil 240 and the secondary self-resonant coil 110 can be caused to resonate in the even mode even if the coupling coefficient κ varies.

The capacitance value of the secondary self-resonant coil 110 may be fixed, and the capacitance value of the primary self-resonant coil 240 may be variable. In this case, the power transmission system is configured, for instance, as described below. With reference to FIGS. 12 and 13, the primary self-resonant coil 240 has a variable capacitor 112 or a variable capacitance diode 114 connected between conductors.

Figure 14:
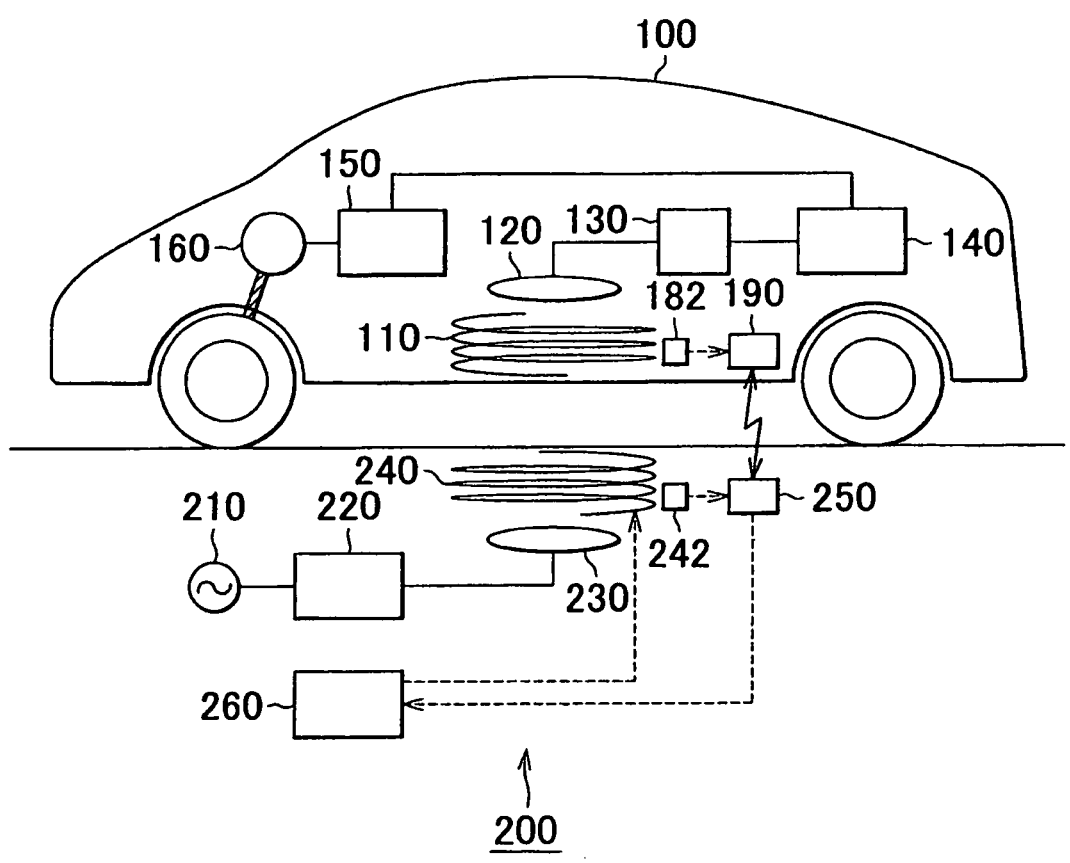
FIG. 14 is diagram for explaining an example of a configuration where a capacitance value of a primary self-resonant coil is caused to vary.

Further, as illustrated in FIG. 14, the power supply device 200 has an ECU 260 capable of modifying the capacitance of the primary self-resonant coil 240 on the basis of current values Ia, Ib received from the communications device 250. The vehicle ECU 260 modifies the capacitance of the primary self-resonant coil 240 in such a way that the detection values of the currents Ia, Ib take on opposite signs.

The primary self-resonant coil 240 and the secondary self-resonant coil 110 may be configured so that the capacitance of each is variable. In this case, the capacitance value of each coil can be caused to change by the vehicle ECU 180 and by the ECU 260 on the side of the power supply device 200.

2. Fixed Coil Parameters

In a case where the frequency of use can be modified, and the parameters (capacitance and so forth) of both the primary self-resonant coil 240 and the secondary self-resonant coil 110 are fixed, resonance in the even mode can be realized by varying the frequency of the high-frequency power.

Figure 15:
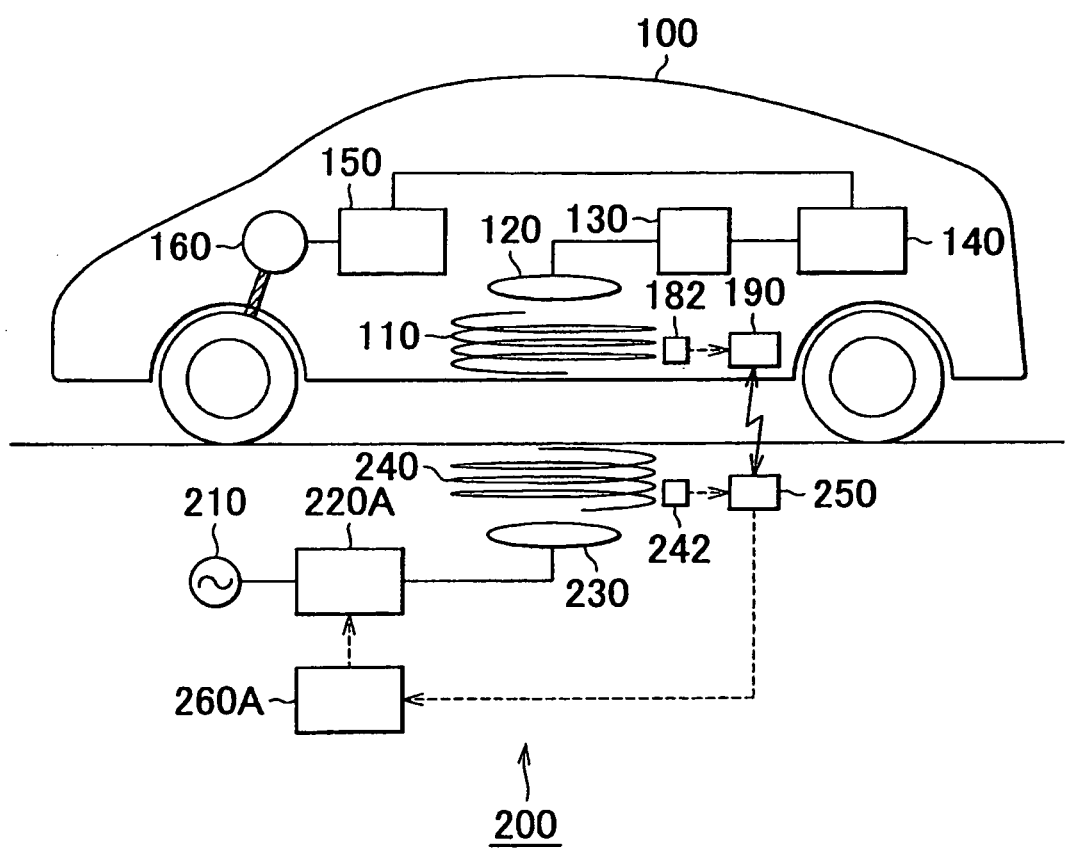
FIG. 15 is a diagram for explaining an example of a configuration where frequency of high-frequency power is caused to vary.

With reference to FIG. 15, the power supply device 200 has an ECU 260A and a high-frequency power driver 220A. The configurations of other elements of the power supply device 200 are identical to those illustrated in FIG. 1. The high-frequency power driver 220A is configured in such a manner that the frequency of high-frequency power can be modified. By way of the communications devices 190, 250, the ECU 260A receives the current value (Ia) of the primary self-resonant coil 240, as detected by the current sensor 242, and the current value (Ib) of the secondary self-resonant coil 110, as detected by the current sensor 182. The ECU 260A controls the high-frequency power driver 220A to vary thereby the frequency of high-frequency power in such a manner that the detection values of the currents Ia, Ib take on mutually opposite signs.

The above-described two types of control can be combined in a case where both the frequency of use and coil parameters (capacitance value) are variable. In such a case as well, the primary self-resonant coil 240 and the secondary self-resonant coil 110 can be made to resonate in the even mode.

In the embodiment of the invention, as described above, the coils in the primary self-resonant coil 240 and the secondary self-resonant coil 110 are caused to resonate in a state where currents of mutually opposite directions flow in the primary self-resonant coil 240 and the secondary self-resonant coil 110. Specifically, the even mode is selected as the resonance mode of the primary self-resonant coil 240 and the secondary self-resonant coil 110. Leak electromagnetic fields can be reduced by transmitting power through resonance of the two coils in the even mode. The structure for shielding against magnetic leaks can be simplified thereby, which in turn allows avoiding increases in the size of the power transmission system.

In the above embodiment, a system for charging an electric vehicle has been explained as an example of the use of the power transmission system. The uses of the invention, however, are not limited to the above-described ones. The invention can be used in any applications where contact-less power supply by resonance can be utilized. Therefore, the invention can be used also, for instance, in ordinary electric articles.

It is to be understood that the illustrated embodiments are merely exemplary in nature, and that the invention is not limited in any way to or by the embodiments.

What is claimed is:

1. A power transmission system, comprising:
   a high-frequency power source that generates high-frequency power;
   a first coil that receives the high-frequency power generated by the high-frequency power source;
   a second coil that receives, by being magnetically coupled to the first coil through magnetic field resonance, the high-frequency power from the first coil;
   a control device that is configured to:
      select: (i) a frequency of the high-frequency power, (ii) a first parameter relating to the first coil, and (iii) a second parameter relating to the second coil, at least one of the first parameter and the second parameter being a capacitance value of the respective first coil and second coil, each of the frequency of the high-frequency power, the first parameter, and the second parameter being selected such that the first coil and the second coil resonate in a state such that, when the high-frequency power is transmitted from the first coil to the second coil:
         a first current flows in the first coil in a first direction;
         a second current flows in the second coil in a second direction; and
         the first direction of the first current is mutually opposite the second direction of the second current; and
      modify the capacitance value of the at least one of the first parameter and the second parameter of the respective first coil and second coil such that the first direction of the first current and the second direction of the second current become mutually opposite;
   a first current sensor configured to detect the first direction of the first current flowing in the first coil; and
   a second current sensor configured to detect the second direction of the second current flowing in the second coil.

2. The power transmission system according to claim 1, wherein:
   the high-frequency power source is configured to modify the frequency of the high-frequency power; and
   the control device controls the high-frequency power source such that the frequency of the high-frequency power varies.

3. A power supply device for a vehicle, for supplying power to a power storage device installed in the vehicle, the power supply device comprising the power transmission system according to claim 1.

4. The power transmission system according to claim 1, wherein the first parameter relates to a capacitance value of the first coil, and the second parameter relates to a capacitance value of the second coil.

\* \* \* \* \*